(12) United States Patent
Daniels

(10) Patent No.: US 11,437,798 B2
(45) Date of Patent: Sep. 6, 2022

(54) COVER PLATE FOR WALL MOUNTED ELECTRICAL DEVICE

(71) Applicant: LIBERTY HARDWARE MFG. CORP., Winston-Salem, NC (US)

(72) Inventor: James Leroy Daniels, Stokesdale, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 36 days.

(21) Appl. No.: 17/072,185

(22) Filed: Oct. 16, 2020

(65) Prior Publication Data

US 2021/0119432 A1    Apr. 22, 2021

Related U.S. Application Data

(60) Provisional application No. 62/915,773, filed on Oct. 16, 2019.

(51) Int. Cl.
*H02G 3/14* (2006.01)
*H02G 3/08* (2006.01)

(52) U.S. Cl.
CPC .............. *H02G 3/14* (2013.01); *H02G 3/081* (2013.01)

(58) Field of Classification Search
CPC ............ H02G 3/14; H02G 3/10; H02G 3/081; H02G 3/18; H02G 3/12; H02G 3/088; H05K 5/02; H05K 5/03; H05K 5/00; H01R 13/5213; H01R 13/6395; H01R 13/46; H01R 13/447; H01R 13/453

USPC .......... 174/66, 67, 53, 57, 58; 220/241, 242, 220/3.2, 3.3; 439/536, 537

See application file for complete search history.

(56) References Cited

U.S. PATENT DOCUMENTS

| | | | | |
|---|---|---|---|---|
| 5,675,125 A | * | 10/1997 | Hollinger | H02B 1/26 174/66 |
| 6,281,440 B1 | * | 8/2001 | Baldwin | H02G 3/14 174/66 |
| 7,102,081 B2 | * | 9/2006 | Xu | H02G 3/14 174/66 |
| 7,183,487 B1 | * | 2/2007 | O'Young | H02G 3/14 174/66 |
| 7,456,358 B2 | * | 11/2008 | Swiencicki | H02G 3/14 174/66 |
| 7,586,040 B1 | * | 9/2009 | Bala | H02G 3/14 174/66 |
| 7,902,458 B2 | * | 3/2011 | Eshelman | H02G 3/14 174/66 |
| 7,947,903 B2 | | 5/2011 | Peck | |
| 8,115,100 B2 | | 2/2012 | Peckham | |

(Continued)

*Primary Examiner* — Angel R Estrada
(74) *Attorney, Agent, or Firm* — Brooks Kushman P.C.; Lora Graentzdoerffer

(57) ABSTRACT

A cover plate assembly is provided with a subplate with a substrate mounted to a wall mounted electrical device, to enclose the electrical device. A rim extends from a periphery of the substrate with a plurality of notches formed into an outer periphery of the rim. A cover plate with a substrate is adapted to be mounted upon the subplate substrate. A rim extends from a periphery of the cover plate substrate. A plurality of fasteners extends from the cover plate rim to engage the plurality of notches in the subplate to fasten the cover plate to the subplate. The plurality of fasteners is formed integrally with the cover plate and concealed within the cover plate rim.

18 Claims, 4 Drawing Sheets

(56) References Cited

U.S. PATENT DOCUMENTS

| | | | |
|---|---|---|---|
| 8,299,358 B2 * | 10/2012 | Huang | H02G 3/14 |
| | | | 174/66 |
| 8,592,681 B2 | 11/2013 | Alderson et al. | |
| 9,148,005 B2 | 9/2015 | Forrest et al. | |
| 9,698,584 B2 | 7/2017 | Shotey | |
| 10,044,178 B2 | 8/2018 | Roberts | |
| 10,756,525 B2 * | 8/2020 | Jackson | H02G 3/14 |
| 2005/0257951 A1 * | 11/2005 | Xu | H02G 3/14 |
| | | | 174/66 |
| 2018/0375311 A1 | 12/2018 | Daniels | |

* cited by examiner

COVER PLATE FOR WALL MOUNTED ELECTRICAL DEVICE

CROSS-REFERENCE TO RELATED APPLICATIONS

This application claims the benefit of U.S. provisional application Ser. No. 62/915,773 filed Oct. 16, 2019, the disclosure of which is hereby incorporated in its entirety by reference herein.

TECHNICAL FIELD

Various embodiments relate to cover plates for wall mounted electrical devices.

BACKGROUND

Forrest et al., U.S. Pat. No. 9,148,005 B2 discloses cover plate assemblies for wall mounted electrical devices.

SUMMARY

According to an embodiment, a cover plate is provided with a substrate adapted to be mounted upon a substrate of a subplate mounted to a wall mounted electrical device, to enclose the electrical device. A rim extends from a periphery of the cover plate substrate. A slot is formed within the rim sized to receive a tool for removal of the cover plate from the subplate.

According to a further embodiment, the slot is spaced apart from the cover plate substrate and faces away from the cover plate substrate to face an associated support surface.

According to another further embodiment, at least one fastener is formed integrally with the cover plate to engage at least one detent in an outer periphery of the subplate to fasten the cover plate to the subplate.

According to an even further embodiment, the slot is aligned with the at least one fastener.

According to another even further embodiment, the at least one fastener is concealed beneath the cover plate.

According to another even further embodiment, the at least one fastener is further provided with a bracket extending inward from the rim and away from the substrate.

According to an even further embodiment, the slot is aligned with, and contained by, the bracket.

According to another even further embodiment, the at least one fastener is further provided with a tab extending inward from the bracket.

According to an even further embodiment, the tab includes a first ramped surface to engage the subplate and elastically deform the at least one fastener during assembly.

According to an even further embodiment, the tab includes a second ramped surface to engage the subplate and to at least partially relax during assembly to retain the at least one fastener upon the subplate.

According to another further embodiment, the at least one fastener is further provided with a tab extending inward from the rim.

According to another further embodiment, the cover plate does not include any mounting screw openings.

According to another further embodiment, a plurality of fasteners is formed integrally with the cover plate to engage a plurality of detents in an outer periphery of the subplate to fasten the cover plate to the subplate.

According to another further embodiment, the electrical device is further provided as an electrical outlet.

According to another embodiment, a cover plate is provided with a substrate adapted to be mounted upon a substrate of a subplate mounted to a wall mounted electrical device, to enclose the electrical device. A rim extends from a periphery of the cover plate substrate. At least one fastener is formed integrally with the cover plate to engage at least one detent in an outer periphery of the subplate to fasten the cover plate to the subplate. The at least one fastener is concealed beneath the cover plate.

According to a further embodiment, the at least one fastener is further provided with a bracket extending inward from the rim and away from the substrate.

According to an even further embodiment, the at least one fastener is further provided with a tab extending inward from the bracket.

According to another embodiment, a cover plate assembly is provided with a subplate with a substrate mounted to a wall mounted electrical device, to enclose the electrical device. A rim extends from a periphery of the substrate with a plurality of notches formed into an outer periphery of the rim. A cover plate with a substrate is adapted to be mounted upon the subplate substrate. A rim extends from a periphery of the cover plate substrate. A plurality of fasteners extends from the cover plate rim to engage the plurality of notches in the subplate to fasten the cover plate to the subplate. The plurality of fasteners is formed integrally with the cover plate and concealed within the cover plate rim.

According to a further embodiment, the plurality of notches is formed on two lateral sides of the subplate rim.

According to an even further embodiment, a pair of notches are formed on each lateral side of the subplate rim.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
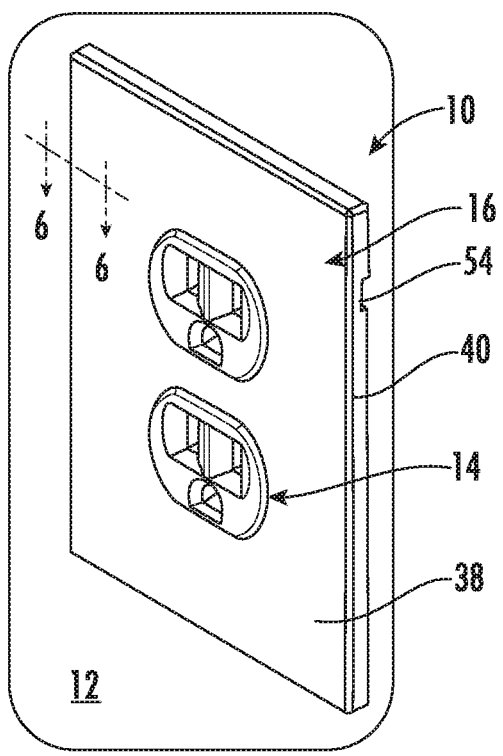
FIG. 1 is a front perspective view of a wall mounted electrical device with a cover plate according to an embodiment.
Figure 2:
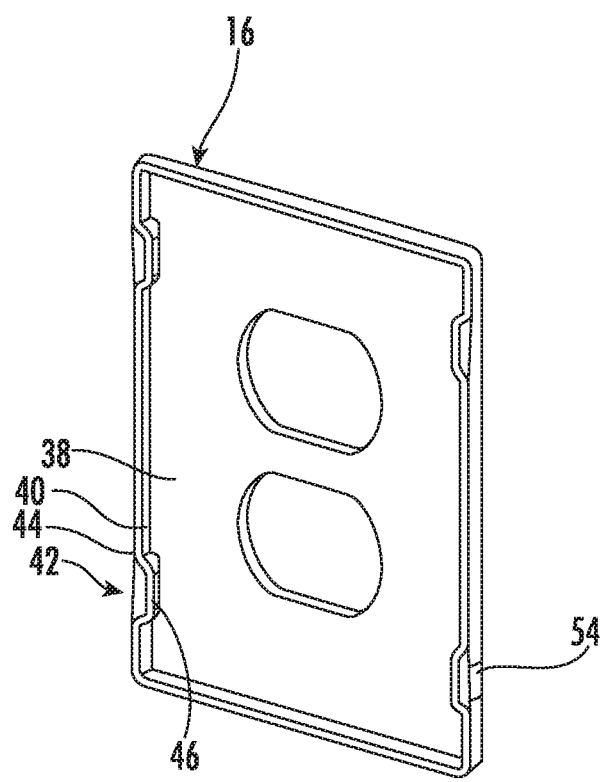
FIG. 2 is a rear perspective view of the cover plate of FIG. 1.
Figure 3:
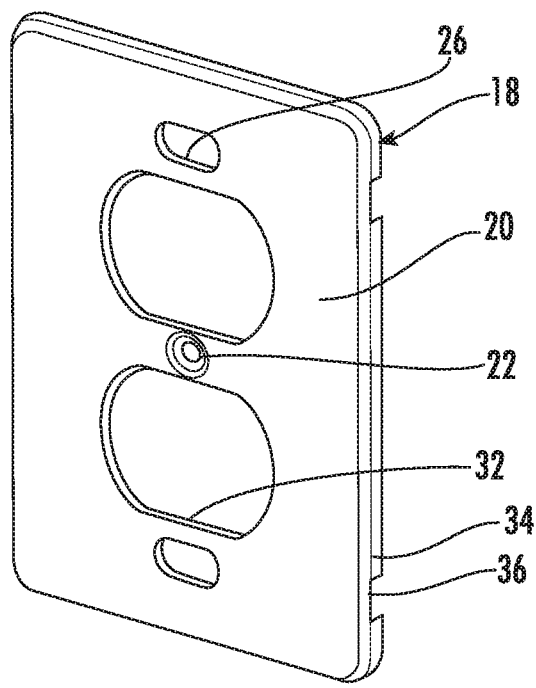
FIG. 3 is a front perspective view of a subplate for the wall mounted electrical device of FIG. 1.

FIG. 1 illustrates an electrical device 10 mounted to a wall 12 according to an embodiment. The electrical device 10 depicted includes a single duplex electrical outlet 14. A cover plate 16 is attached to the electrical device 10 to at least partially enclose the electrical device 10. The cover plate 16 is illustrated removed from the electrical device 10 in FIG. 2. A subplate 18 is illustrated in FIG. 3 according to an embodiment. Although a single duplex electrical outlet 14 is illustrated, any electrical device can be employed, such as switches, combinations of outlets and switches, or the like. Likewise, any accommodating cover plate 16 and subplate 18 may be employed, including switch-plates, combination plates, blank cover plates, and the like.

Wall mounted electrical devices are typically standardized with a yoke with threaded apertures for receipt of threaded fasteners for installing a cover plate. Accordingly, the subplate 18 (FIG. 3) is provided with a substrate 20 that is adapted to be mounted to the electrical device 10 for enclosing the electrical device 10. The substrate 20 may, for example, include one or a series of countersunk apertures 22 for receipt of heads of threaded fasteners 24 (FIG. 5) for fastening the subplate 18 to the yoke of the electrical device 10. The apertures 22 may be oriented in any suitable pattern associated with a fastener pattern of an electrical device.

A height and a width of the subplate 18 are sized to effectively cover a standard electrical wall box opening. The substrate 20 of the subplate 18 may also include clearance apertures 26 (FIGS. 3 and 5) aligned with a pattern of fasteners 28 (FIG. 5) for securing the electrical device 10 within a junction box 30 (FIG. 6). The clearance apertures 26 permit the substrate 20 to abut the yoke of the electrical device 10. The substrate 20 also includes access openings 32 (FIGS. 3 and 5) for access to the electrical device 10.

The subplate 18 can be fabricated of a pre-galvanized stamped steel in order to meet corrosion resistance requirement of Underwriters Laboratories Standard UL514D (Cover Plates for Flush-Mounted Wiring Devices). The access openings 32 within the substrate 20 of the subplate 18 are utilized to make adjustments or connections to the electrical devices 10. The overall size of the subplate 18, the countersunk apertures 22, and clearance apertures 26 are sized and designed to meet National Electrical Manufacturers Association (NEMA) standard WD6 which covers Wiring Device Dimensional Specifications. Typically, the access openings 32 are fitted for standard toggle switches, antique push button switches, duplex devices and Ground Fault Circuit Interruptor (GFCI) receptacles, and the like.

Figure 5:
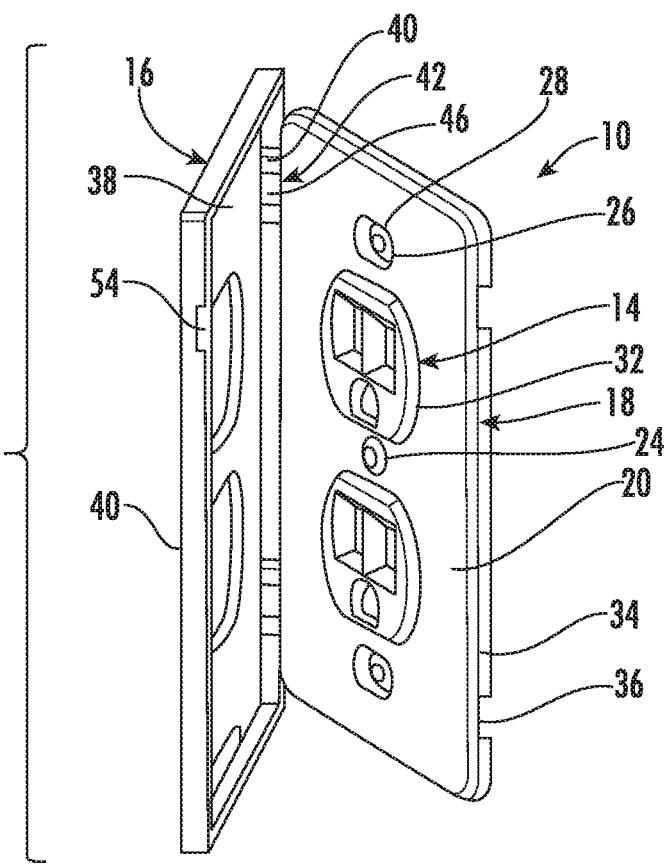
FIG. 5 is a partially exploded front perspective view of the wall mounted electrical device of FIG. 1.
Figure 6:
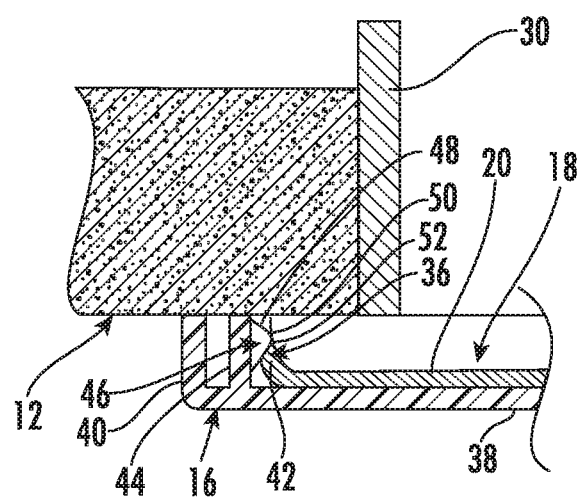
FIG. 6 is a partial section view of the wall mounted electrical device of FIG. 1 taken along section line 6-6.

With continued reference to FIGS. 3 and 5, the subplate 18 includes a rim 34 extending from a periphery of the subplate substrate 20. A plurality of detents is provided by notches 36 formed in an outer periphery of the subplate rim 34. The notches 36 in the depicted embodiment are formed on two lateral sides of the rim 34, with a pair of notches 36 on each lateral side.

Referring again to FIGS. 1 and 2, the cover plate 16 may be decorative and covers the subplate 18 upon installation to the electrical device 10. The cover plate 16 is formed from a polymeric molded material such as a plastic that provides structural integrity, insulative properties, and sufficient elasticity. Suitable materials may include acrylonitrile butadiene styrene (ABS), polypropylene, or nylon materials, or the like.

The cover plate 16 has a substrate 38 that is sized to be mounted upon the subplate substrate 20. A peripheral rim 40 extends from the cover plate substrate 38 for engaging the wall 12 and concealing the subplate 18. A series of fasteners 42 (FIGS. 2 and 4-6) are provided beneath the cover plate 16 in engagement with the subplate 18 for fastening the cover plate 16 to the subplate 18. Once installed, the series of fasteners 42 are concealed beneath the cover plate 16. The fasteners 42 are molded integrally with the cover plate 16 and are aligned with the notches 36 in the subplate 18.

Figure 4:
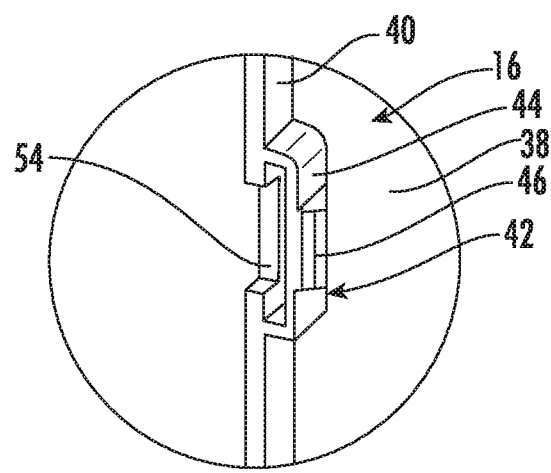
FIG. 4 is an enlarged rear perspective view of a fastener of the cover plate of FIG. 1.

Referring to FIGS. 4-6, the fasteners 42 includes a bracket 44 extending inward from the rim 40 and away from the substrate 38. Each bracket 44 includes a tab or a retainer 46 extending inward from the bracket 44. Each retainer 46 is ramped away from the bracket 44 and back toward the bracket 44. During installation, the cover plate 16 is pressed onto the subplate 18 as illustrated in FIG. 5.

The installed cover plate 16 upon the subplate 18 is illustrated in FIG. 6. During installation, a first ramped surface 48 of the retainer 46 engages the subplate rim 34 and elastically deforms the retainer 46 and the bracket 44 to permit the retainers 46 to pass over the subplate rim 34. Once a peak 50 of the retainer 46 extends into the notch 36, the retainers 46 and the brackets 44 relax at least partially with a second ramped surface 52 of the retainer 46 engaging the notch 36 thereby retaining the retainers 46 in the notches 36, and consequently retaining the cover plate 16 upon the subplate 18.

As illustrated in FIG. 1, the decorative cover plate 16 is free of mounting screw openings. The integral fasteners 42 allow the decorative cover plate 16 to easily engage and be secured to the subplate 18. The interchangeability of the cover plate 16 permits alternate decorative cover plate designs to be available to the consumer. The interchangeability also allows removal of the existing cover plate 16; and replacing the cover plate 16 with an alternative design without removing the subplate 18.

The design of the subplate 18 minimizes the size and location of apertures through the subplate 18 to meet industry standards while also minimizing an overall size of the cover plate 16 to minimize cost. The subplate 18 may be manufactured from a pre-galvanized stamped steel material having an overall height of at least 4.87 inches (123.70 millimeters) and an overall width of at least 3.12 inches (79.25 mm) for single gang wall plate configurations. Multiple gangs of 2, 3, 4 or any integer factor, are incrementally larger than a single gang by adding 1.812" (46.04 mm) per gang added. This approach leaves a limited access area where an interface or latching mechanism can be installed. Because of this limited area, the cover plate 16 provides a fastener 42 arrangement that avoids high machining or manufacturing tolerances and secondary operations which would have increased production costs on a highly competitive and commoditized product.

A single wall plate 16 can be sized to accept any number of electrical devices and in any combination thereof. The subplate 18 may meet all of the industry standard requirements while the decorative cover plate 16 can be made from any material to achieve its decorative purpose including but not limited to wood, plastic, glass, stone and resin. By doing so, the subplate 18 can be made in large volumes at relatively low cost and the decorative cover plate 16 avoids some of the restrictions imposed on electrical enclosures since those requirements are being accomplished by the subplate 18. The consumer benefits from this design since decorative cover plate designs can be changed out to suit a change in décor without removing the UL rated subplate 18. Models can be retailed which exclude the subplate 18 for customers which already have a subplate 18 installed, thereby removing the additional cost associated with that component.

Figure 7:
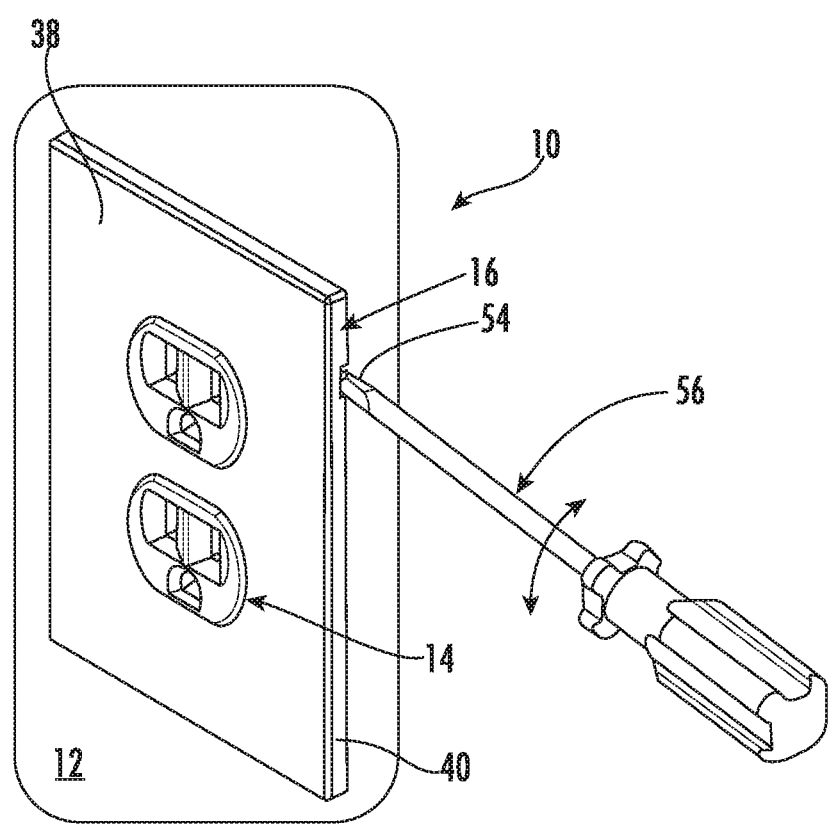
FIG. 7 is another front perspective of the wall mounted electrical device of FIG. 1 illustrating a disassembly step.

Once the cover plate 16 is snapped onto the subplate 18, the retainers 46 provide an interference fit within the notches 36 to retain the cover plate 16 upon the subplate 18. The second ramped surfaces 52 urge the rim 40 of the cover plate 16 into engagement with the wall. In order to assist in removal of the cover plate 16 from the subplate 18, a pair of slots 54 are formed in the rim 40 of the cover plate 16. The slots 54 are illustrated in FIGS. 1, 2, 4, 5, and 7. The slots 54 are formed in the rim 40 spaced apart from the cover plate substrate 38 and facing the wall 12 to permit a tool, such as a flat blade screwdriver 56 to be inserted into the slot as shown in FIG. 7. As illustrated by the arcuate arrows in FIG. 7, a slight rotation of the screwdriver 56 engages the slot 54 and the wall 12, thereby disengaging the fasteners 42 from the notches 36. Then, with reference to FIG. 5, the cover plate 16 may be removed from the subplate 18.

Referring again to FIGS. 2 and 4, the slots 54 are aligned with two of the fasteners 42. This alignment permits the slots 54 in the rim 40 to be contained by the bracket 44, thereby maintaining continuity in the periphery of the rim 40.

The integral cover plate 16 with fasteners 42 reduce components, thereby reducing component costs, material costs, weight, manufacturing costs, manufacturing complexities, installation complexities, and the like.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cover plate comprising:
   a substrate adapted to be mounted upon a substrate of a subplate mounted to a wall mounted electrical device, to enclose the electrical device;
   a rim extending from a periphery of the cover plate substrate, wherein a slot is formed within the rim sized to receive a tool for removal of the cover plate from the subplate; and
   at least one fastener formed integrally with the cover plate to engage at least one detent in an outer periphery of the subplate to fasten the cover plate to the subplate, wherein the slot is aligned with the at least one fastener at a location along the periphery of the cover plate substrate.

2. The cover plate of claim 1 wherein the slot is spaced apart from the cover plate substrate and faces away from the cover plate substrate to face an associated support surface.

3. The cover plate of claim 1 wherein the at least one fastener is concealed beneath the cover plate.

4. The cover plate of claim 1 wherein the at least one fastener further comprises a bracket extending inward from the rim and away from the substrate.

5. The cover plate of claim 4 wherein the slot is aligned with, and contained by, the bracket.

6. The cover plate of claim 4 wherein the at least one fastener further comprises a tab extending inward from the bracket.

7. The cover plate of claim 6 wherein the tab includes a first ramped surface to engage the subplate and elastically deform the at least one fastener during assembly.

8. The cover plate of claim 7 wherein the tab includes a second ramped surface to engage the subplate and to at least partially relax during assembly to retain the at least one fastener upon the subplate.

9. The cover plate of claim 1 wherein the at least one fastener further comprises a tab extending inward from the rim.

10. The cover plate of claim 1 wherein the cover plate does not include any mounting screw openings.

11. The cover plate of claim 1 wherein the at least one fastener further comprises a plurality of fasteners formed integrally with the cover plate to engage a plurality of detents in an outer periphery of the subplate to fasten the cover plate to the subplate.

12. The cover plate of claim 1 wherein the electrical device further comprises an electrical outlet.

13. A cover plate assembly comprising:
   a subplate with a substrate mounted to a wall mounted electrical device, to enclose the electrical device, with a rim extending from a periphery of the substrate with a plurality of notches formed into an outer periphery of the rim;
   a cover plate according to claim 1, mounted upon the subplate substrate; and
   wherein the at least one fastener further comprises a plurality of fasteners extending from the cover plate rim to engage the plurality of notches in the subplate to fasten the cover plate to the subplate, wherein the plurality of fasteners is formed integrally with the cover plate and concealed within the cover plate rim.

14. The cover plate assembly of claim 13 wherein the plurality of notches is formed on two lateral sides of the subplate rim.

15. The cover plate assembly of claim 14 wherein a pair of notches are formed on each lateral side of the subplate rim.

16. A cover plate comprising:
   a substrate adapted to be mounted upon a substrate of a subplate mounted to a wall mounted electrical device, to enclose the electrical device;
   a rim extending from a periphery of the cover plate substrate; and
   at least one fastener formed integrally with the cover plate to engage at least one detent in an outer periphery of the subplate to fasten the cover plate to the subplate, wherein the at least one fastener is concealed beneath the cover plate;
   wherein the at least one fastener further comprises a bracket extending inward from the rim and away from the substrate; and
   wherein the at least one fastener further comprises a tab extending inward from the bracket.

17. The cover plate of claim 16 wherein a slot is formed within the rim sized to receive a tool for removal of the cover plate from the subplate.

18. The cover plate of claim 17 wherein the slot is aligned with, and contained by, the bracket.

* * * * *